US 9,892,610 B1

United States Patent
Lange

(10) Patent No.: US 9,892,610 B1
(45) Date of Patent: Feb. 13, 2018

(54) SYSTEMS, METHODS, AND DEVICES FOR LOCATING ITEMS, PEOPLE, AND/OR ANIMALS

(71) Applicant: Awearable Apparel Inc., New York, NY (US)

(72) Inventor: Justin Lange, Brooklyn, NY (US)

(73) Assignee: Awearable Apparel Inc., New York, NY (US)

( * ) Notice: Subject to any disclaimer, the term of this patent is extended or adjusted under 35 U.S.C. 154(b) by 0 days.

(21) Appl. No.: 15/173,239

(22) Filed: Jun. 3, 2016

Related U.S. Application Data

(60) Provisional application No. 62/171,213, filed on Jun. 4, 2015.

(51) Int. Cl.
  *G08B 21/02* (2006.01)
  *G08B 5/22* (2006.01)
  *G01S 19/13* (2010.01)
  *G01S 5/02* (2010.01)

(52) U.S. Cl.
  CPC ........ *G08B 21/0269* (2013.01); *G01S 5/0263* (2013.01); *G01S 19/13* (2013.01); *G08B 5/223* (2013.01); *G08B 21/0236* (2013.01); *G08B 21/0288* (2013.01)

(58) Field of Classification Search
  CPC ........ G01S 19/14; G01S 19/51; G01S 5/0027; G01S 5/009; G01C 21/26; G01C 21/00; G08B 2001/085; G08B 21/0202; G08B 21/023; G08B 21/0205; H04W 52/02; H04W 52/0229; H04W 52/0225
  See application file for complete search history.

(56) References Cited

U.S. PATENT DOCUMENTS

| 6,738,712 B1* | 5/2004 | Hildebrant | G01C 21/26 701/431 |
| 7,271,717 B1* | 9/2007 | Amos | G08B 21/0202 340/522 |

(Continued)

OTHER PUBLICATIONS

Chiang et al., "Localization in Wireless Sensor Networks by Fuzzy Logic System", in the Proceedings of the International Conference on Knowledge-Based and Intelligent Information and Engineering Systems, Santiago, CL, Sep. 28-30, 2009, pp. 721-728.

(Continued)

*Primary Examiner* — An T Nguyen
(74) *Attorney, Agent, or Firm* — Byrne Poh LLP

(57) ABSTRACT

Systems, methods, and devices for locating items, people, and/or animals are provided. In accordance with some embodiments, locator devices for locating a target device are provided, the locator devices comprising: a first transceiver configured to communicate with a second transceiver in the target device; a Global Navigation Satellite System (GNSS) receiver configured to receive data from a plurality of satellites for calculating a location; a visual indicator; and a hardware processor that: receives signals from the first transceiver; calculates an estimated distance between the locator device and a target device based on the signals; controls whether the GNSS receiver is powered on or off based on the estimated distance; and causes the visual indicator indicate an estimated direction to the target device from the locator device.

26 Claims, 6 Drawing Sheets

(56) References Cited

U.S. PATENT DOCUMENTS

| | | | | |
|---|---|---|---|---|
| 7,315,242 | B2* | 1/2008 | Eisenman | B60R 25/1003 |
| | | | | 340/426.1 |
| 7,847,709 | B2* | 12/2010 | McCall | G08G 1/005 |
| | | | | 340/426.13 |
| 9,207,083 | B2* | 12/2015 | Hsu | G01C 21/00 |
| 9,696,428 | B2* | 7/2017 | Lee | G01S 19/07 |
| 2001/0026240 | A1* | 10/2001 | Neher | G01S 5/0018 |
| | | | | 342/357.75 |
| 2005/0131639 | A1* | 6/2005 | Broussard | G01C 21/20 |
| | | | | 701/533 |
| 2008/0246656 | A1* | 10/2008 | Ghazarian | G08B 25/016 |
| | | | | 342/357.54 |
| 2012/0235860 | A1* | 9/2012 | Ghazarian | G01S 19/16 |
| | | | | 342/357.4 |
| 2013/0218456 | A1* | 8/2013 | Zelek | G01C 21/3652 |
| | | | | 701/412 |
| 2015/0053144 | A1* | 2/2015 | Bianchi | A01K 27/001 |
| | | | | 119/720 |
| 2015/0279187 | A1* | 10/2015 | Kranz | G08B 21/0415 |
| | | | | 340/539.12 |
| 2015/0369921 | A1* | 12/2015 | Lee | G01S 19/07 |
| | | | | 701/469 |

OTHER PUBLICATIONS

Geographic Information Systems Stack Exchange, "Trilateration Algorithm for N Amount of Points", Nov. 2012, pp. 1-6, available at: https://gis.stackexchange.com/questions/40660/trilateration-algorithm-for-n-amount-of-points.

* cited by examiner

SYSTEMS, METHODS, AND DEVICES FOR LOCATING ITEMS, PEOPLE, AND/OR ANIMALS

CROSS REFERENCE TO RELATED APPLICATION

This application claims the benefit of U.S. Provisional Patent Application No. 62/171,213, filed on Jun. 4, 2015, which is hereby incorporated by reference herein in its entirety.

BACKGROUND

Items, people, and animals frequently become lost from people who want to know the location of the items, people, and animals. For example, a parent may want to know the location of a child that has wondered away from the parent.

Accordingly, new systems, methods, and devices for locating items, people, and/or animals are desirable.

SUMMARY

Systems, methods, and devices for locating items, people, and/or animals are provided. In accordance with some embodiments, locator devices for locating a target device are provided, the locator devices comprising: a first transceiver configured to communicate with a second transceiver in the target device; a Global Navigation Satellite System (GNSS) receiver configured to receive data from a plurality of satellites for calculating a location; a visual indicator; and a hardware processor that: receives signals from the first transceiver; calculates an estimated distance between the locator device and a target device based on the signals; controls whether the GNSS receiver is powered on or off based on the estimated distance; and causes the visual indicator indicate an estimated direction to the target device from the locator device.

DETAILED DESCRIPTION

Systems and methods (hereinafter collectively "mechanisms") for locating items and/or people are provided. In some embodiment, these mechanisms can be used to locate any suitable item (e.g., such as bag), person (e.g., such as a child, a mentally handicapped person), animal (e.g., such as a pet), or anything else capable of having a target device (as described herein) attached thereto.

In some embodiments, the mechanisms can include a locator device that is used to monitor and find the location of a target device. The locator device and the target device can be implemented in any suitable form. For example, the locator device and the target device can be implemented as a stand-alone system comprising two handheld devices, each having internal electronics, a visual indicator mechanism (e.g., such as a display or LED indicator lights), an audio generating mechanism (e.g., such as an amplifier, a speaker, and/or a headphone jack), and a user input mechanism (e.g., such as buttons and/or a touch screen interface). As another example, the locator device can be implemented as a two-part apparatus that includes a mobile computing device (e.g., such as a smartphone, a tablet computer, a laptop computer, a smart watch, etc.) and a transceiver device that can communicate with the mobile computing device (e.g., via a wired or wireless interface (e.g., Bluetooth, Wifi, etc.).

Figure 1:
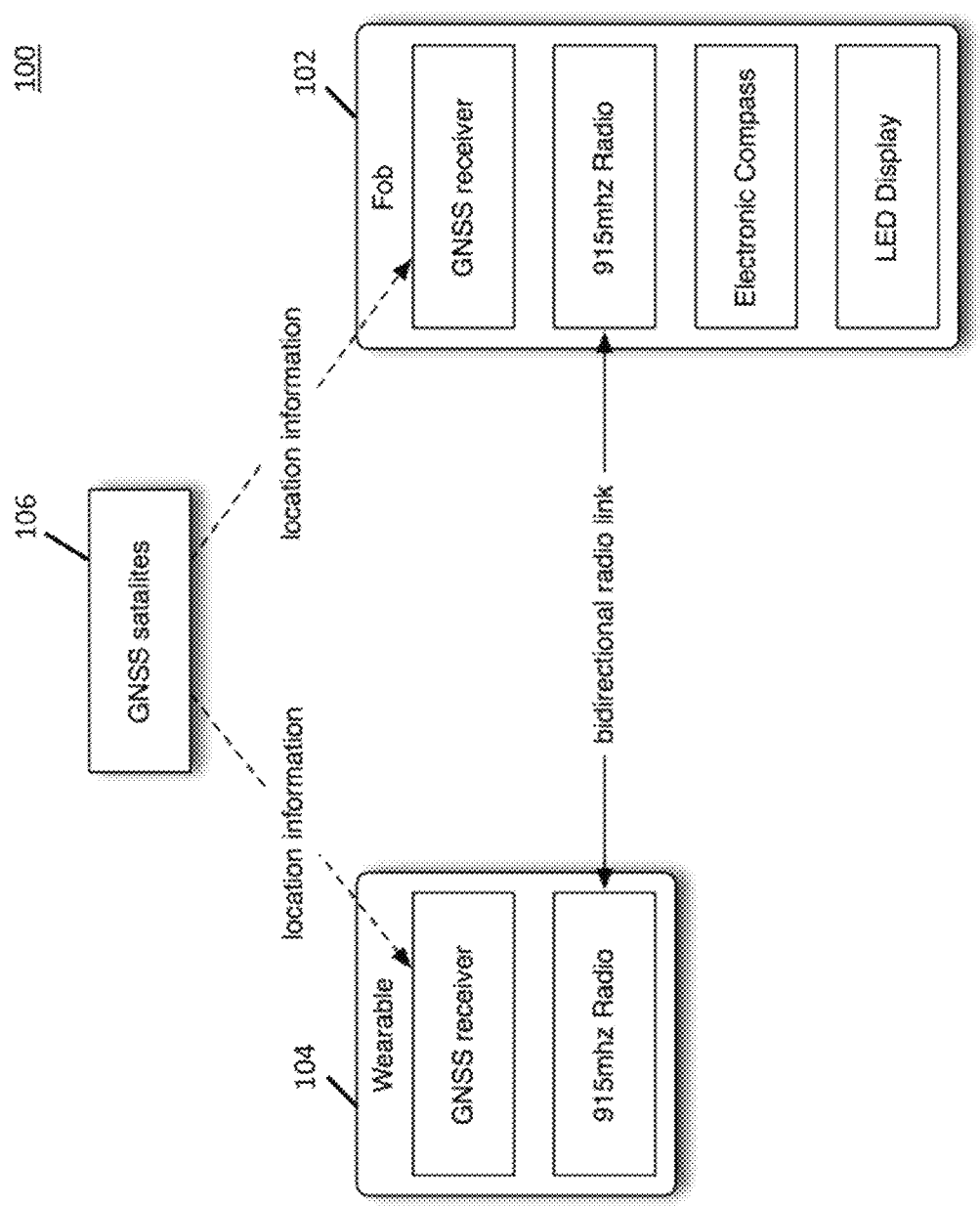
FIG. 1 is a block diagram of an example of a system architecture in accordance with some embodiments.

Turning to FIG. 1, a block diagram 100 of an example of hardware for implementing the mechanism is provided. As shown, the locator device can be implemented as a handheld device ("fob") 102 and the target device can be implemented as a wearable device ("wearable") 104. Both the fob and the wearable can include a Global Navigation Satellite System (GNSS) system receiver (for receiving signals from GNSS satellites 106), a radio transceiver (e.g., a 915 MHz (or any other suitable frequency or combination of frequencies transceiver)), a processor (e.g., a microcontroller, a microprocessor, a digital signal processor, etc.), and a power source. The fob can also include an electronic compass (or any other suitable orientation detection mechanism) and an LED display (or any other suitable output mechanism). In some embodiments, the wearable can also include an electronic compass (or any other suitable orientation detection mechanism) and an LED display (or any other suitable output mechanism).

Although the mechanisms are described herein as using a GNSS receiver (and GNSS satellites), it should be apparent that any suitable position location mechanism (e.g., such as radio signal triangulation, cell phone signal triangulation, etc.) can be used.

Figure 2:
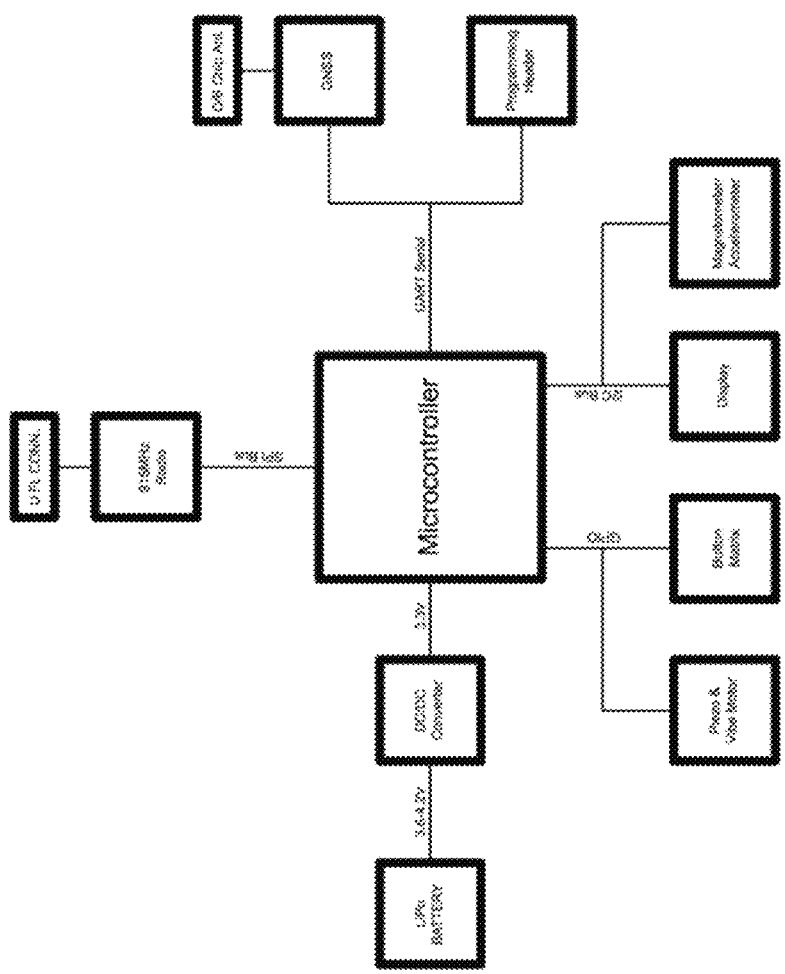
FIG. 2 is a block diagram of an example of a locator device in accordance with some embodiments.

A more detailed illustration of an example of a locator device in accordance with some embodiments is shown in FIG. 2. As illustrated, in some embodiments, the locator device can include a microcontroller, a battery, a DC to DC converter, a piezo buzzer, a vibration motor, a button matrix, a display, a magnetometer/accelerometer, a programming interface, a GNSS receiver, a GNSS receiver antenna, a radio transceiver, a radio transceiver antenna, and/or any other suitable components.

Figure 3:
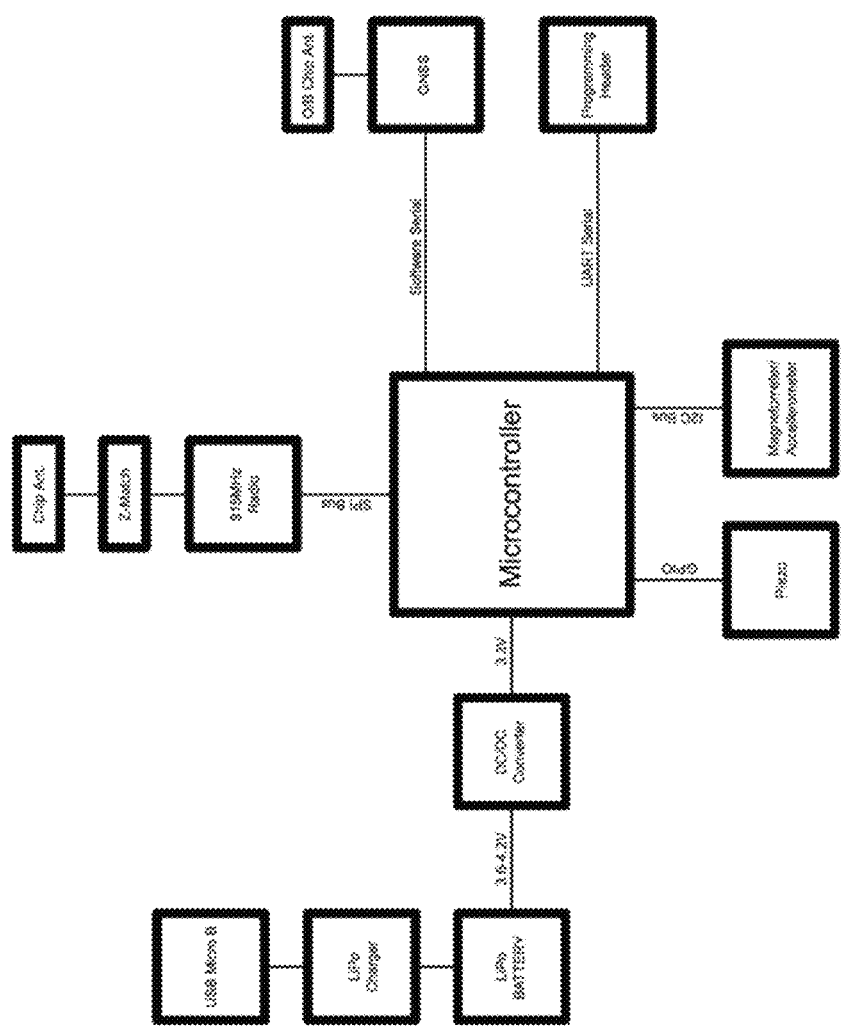
FIG. 3 is a block diagram of an example of a target device in accordance with some embodiments.

A more detailed illustration of an example of a target device in accordance with some embodiments is shown in FIG. 3. As illustrated, in some embodiments, the target device can include a microcontroller, a USB port, a battery charger, a battery, a DC to DC converter, a piezo buzzer, a magnetometer/accelerometer, a programming interface, a GNSS receiver, a GNSS receiver antenna, a radio transceiver, a radio transceiver antenna, a radio receiver impedance match circuit, and/or any other suitable components.

In some embodiments, the microcontrollers shown in FIGS. 2 and 3 can include programmable non-volatile memory for storing program instructions for controlling the operation of the microcontrollers. Any suitable amount and type of memory can be provided in some embodiments. In some embodiments, the locator device and the target device can additionally or alternatively include separate non-volatile memory (e.g., for storing program instructions) and volatile memory (e.g., for storing transient data).

Figure 4:
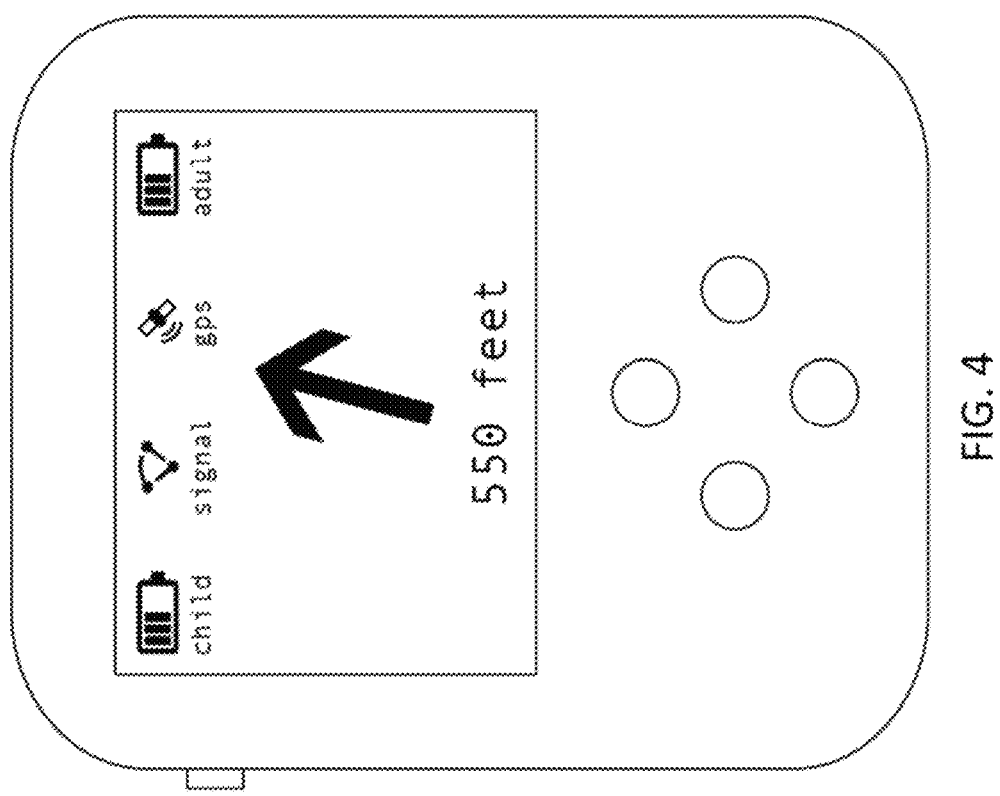
FIG. 4 is an illustration of an example of a user interface of a locator device in accordance with some embodiments.

In accordance with some embodiments, the locator device and the target device can perform the following:

1. On the locator device, a user interface can be provided that allows a user to select a maximum distance ("safe zone") within which the target (e.g., the item, person, animal, etc. to which the target device is attached) is allowed to be from the locator device without a warning being produced.
2. A radio link between the radio transceivers of the locator device and the target device can be turned ON and a maximum distance between their transceivers estimated using received signal strength indication (RSSI). This distance can be measured by solving for distance from the following equation:

$$RSSI = -(10*n*\log 10(d) + A),$$

where RSSI is the received power at the locator device, d is the estimated distance between the target device and the locator device, A is the transmit power from the target device (which can be known in any suitable manner, such as by being indicated in the received signal, by being known based upon design parameters, etc.), and n is a signal propagation constant that varies from environment to environment. This signal propagation constant can range from around 2 to 4, where 2 is a free-space value (e.g., no obstruction, line of sight) and 4 represents a very lossy environment. Thus, in determining the maximum distance, n can be presumed to be 2 (or any other suitable value).
3. The locator device can periodically turn ON its GNSS receiver and calculate its own position.
4. The locator device can wirelessly communicate certain system settings to the target device to control the target device.
5. The target device can turn ON its GNSS receiver, calculate its position, and, after calculating its position, transmits its coordinates to the locator device.
6. After receiving the coordinates for the target device, the locator device can calculate the approximate distance between the locator device and the target device based on the two coordinate pairs.
7. The locator device can compare the determined distance with the maximum distance ("safe zone") previously selected by the user.
8. If the target device is determined to be within the safe zone by at least some margin (e.g., 10%), the locator device can turn OFF one or more components (e.g., the GNSS receiver, the radio transceiver, etc.) of the locator device for some period of time as well as transmit a message to the target device to do the same.
9. After the period of time has elapsed, both the target device and the locator device turn ON any suitable components and repeat 2, 3, and 5-8 above.
10. If the target device is close to (e.g., within some margin (e.g., 10%) of) the edge of, or outside of, the user-determined "safe zone", the locator device can vibrate as well as audibly alert the user.
11. The locator device can calculate the direction from the locator device to the target device based on the coordinates.
12. As shown in FIG. 4, the locator device's led screen can display an arrow pointing to the location of the target device based on the orientation of the locator device relative to the Earth (which can be determined, e.g., using a tilt-compensated compass) and the determined direction from the locator device to the target device.
13. As also shown in FIG. 4, the locator device can additionally display the distance between its current location and the location of the target device in any suitable units (e.g., feet).
14. A user can use the arrow and the distance to find the target.

Figure 5:
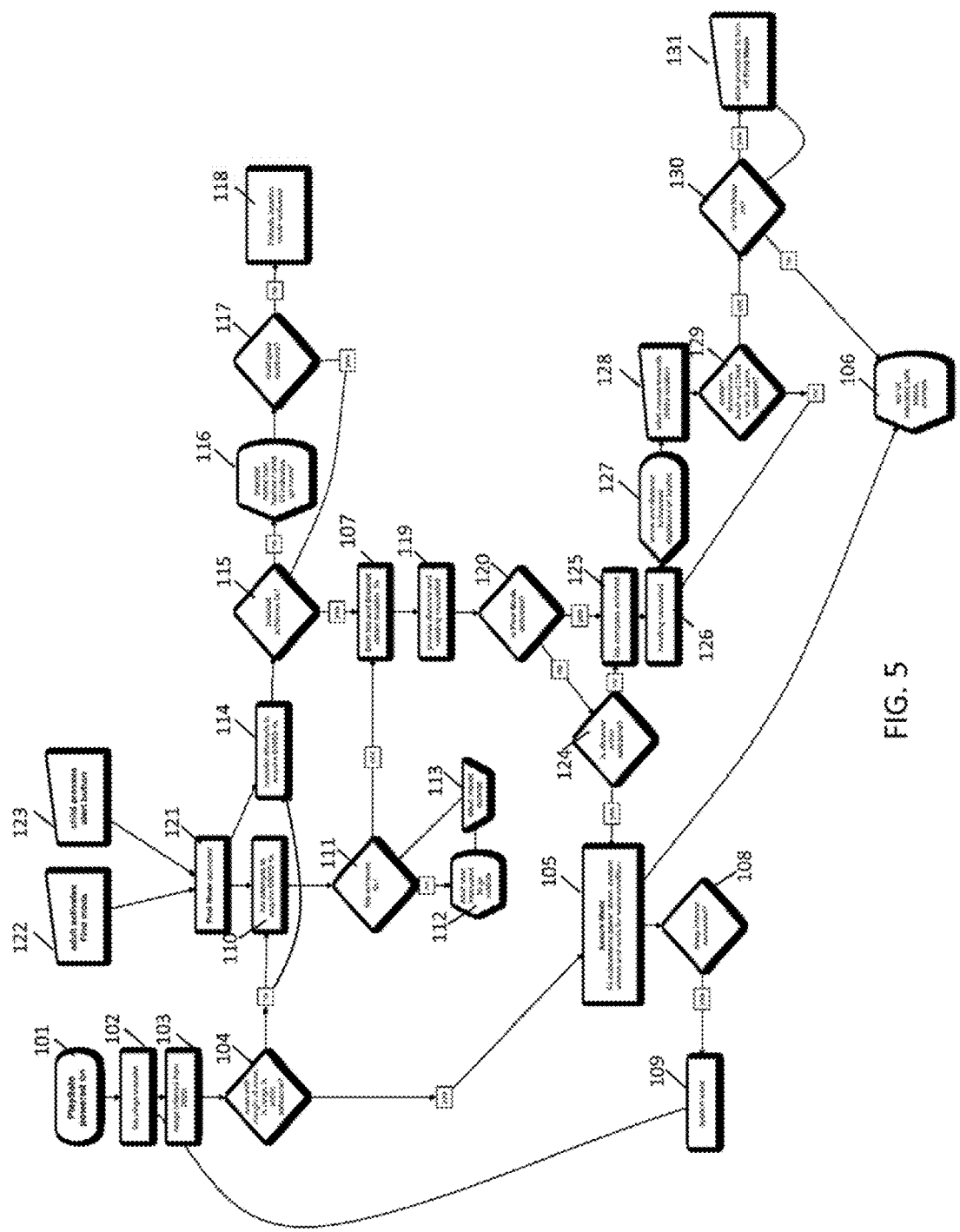
FIG. 5 is a flow diagram of an example of the operation of an example of a system in accordance with some embodiments.

Turning to FIG. 5, a flow diagram describing the operation of an example of a system in accordance with some embodiments is shown. Although this example illustrates a particular system relating to a child locator, it should be apparent that what is described in this FIG. 5 can be used in other embodiments as well.

Beginning at 101, the system can be turned ON.

Next at 102, the locator device (described in connection with this figure as a Fob) can transmit a message to the target device (described in connection with this figure as a Bracelet).

At 103, the Fob can determine the location of the Bracelet from RSSI as described above.

At 104, the Fob can determine if whether the Bracelet is within the safe zone (even accounting for a margin of error). If the Bracelet is determined to be within the safe zone, then, at 105, one or more portions of the transceivers can power down to save battery charge, and, at 106, a user indicator can indicate that the child is in the safe zone. At 108, a determination can be made as to whether a sleep interval (which can have any suitable duration) has been exceeded. If so, the powered down portions can power back up at 109 and the process can loop back to 102.

If the Bracelet is determined to not be in the safe zone at 104, then at 110 and 114, the Fob and the Bracelet can attempt to acquire a GNSS fix.

At 111, the process can determine if a fix was achieved by the Fob. If not, at 112, the Fob user (e.g., the adult) can be instructed to go outside. At 113, the user can move outside (which may be determined by receiving an indication of a user button press) and then the process can loop back to 111.

At 115, the process can determine if a fix was achieved by the Bracelet. If not, at 116 the Bracelet can flash a home icon or otherwise indicate to the child that he/she should go home. At 117, the process can determine if the child went outdoors (e.g., based on any suitable indicator such as detecting one or more satellites, a change in temperature, a change in light, etc.). If it is not determined that the child has gone outdoors within a specified period of time, a failsafe location mode can be activated at 118. Otherwise, if it is determined that the child has gone outdoors, the process can loop back to 115.

After it is determined at 107 that both the Fob and the Bracelet have achieved a fix, at 119, a distance, relative direction, heading, speed, and any other suitable data can be calculated.

At 120, the process can determine whether a Find Mode has been activated. A Find Mode can be activated at 121 in response to an adult activating it at 122 or a child pressing an alert button at 123. Once Find Mode is activated, 110 and 114 can be performed as described above.

If it is determined at 120 that Find Mode has not been activated, then at 124, the process can determine if the distance is in the safe zone. If so, then the process can branch to 105. If not, the process can activate a compass in the Fob at 125 and then calculate a heading at 126. Then, at 127, an arrow and distance to the Bracelet can then be presented on the Fob as described above.

At 128, an adult can move toward the child's location. At 129, the process can determine whether the adult and the child are in the same location. If not, the process can loop back to 126. Otherwise, the process can determine if the Find Mode is still on at 130. If yes, the adult can be prompted to turn OFF Find Mode at 131 and process can loop back to 130. If no, the process can branch to 106.

In some embodiments, to increase battery life, the time during which GNSS and radio receivers in the transceivers are turned ON can be reduced. In some embodiments, this can be performed based on the RSSI distance measurements described above at 103 and 104. For example, if the maximum distance based on RSSI is calculated and it is determined that the target locator is not near the edge of the "safe zone" (which is represented by a "yes" to 104) then the GNSS receivers can be kept OFF and rough measurements of distance based on RSSI used.

For example, assume that a user sets the safe zone to 1000 feet and remains stationary at a single location, such as a campsite. If an unsafe location (such as a road) to which a target (e.g., such as child) may attempt to go is 1500 feet from the home, an alarm can be generated at some point well before the 1500-foot distance is reached based on an RSSI maximum distance measurement even with RSSI distance calculation errors.

In some situations, object obstruction(s) may degrade transmitted radio power enough that the Fob and Bracelet may be quite close but the maximum distance calculated from RSSI exceeds the user-determined safe zone. For example, a child who is quite nearby may be hiding behind a rock, through which the radio radiates quite poorly.

To address, this, in some embodiments, when it cannot be conclusively determined from RSSI inference that the target device (e.g., a child) is within the safe zone (i.e., "no" at 104), the GNSS receivers on the locator device and the target device can be turned "ON", and a GNSS measurement of the distance between the locator device and the target device (e.g., the adult and the child) can be calculated at 119.

Because saving battery charge is desirable, a power-down (or "sleep cycle") can be calculated.

To determine the maximum time frame during which it is improbable for the child to exceed the safe zone, the distance between his/her current location and the nearest boundary of the safe zone can be calculated. A maximum default travel rate, such as 5 mph (or any other suitable number) can be used for one or both of the adult and the child. The scenario is considered in which the child immediately begins traveling towards the nearest safe zone boundary. The time that it will take the child to reach this boundary at the default travel rate can then be calculated. For example, if the adult and the child are only 70 feet away from each other at a given point in time, the safe Zone is 1000 feet, and only the child is assumed to be moving, a sleep cycle of at least two minutes can be used as it would take 2.11 minutes to traverse 930 feet at 5 mph.

As mentioned above, in some embodiments, a failsafe location mode can be activated.

GNSS technology works poorly unless it has an unobstructed view of the sky. Except for unusual architecture, or very near to windows, it is usually not possible to obtain a usable GNSS signal indoors. This means that if the child moved to a location that presented an obstructed view of the sky, a situation can be imagined in which the Fob and the Bracelet can communicate via their RF link, and the Fob can determine its location, but the Bracelet cannot determine its own location.

For example, when a child goes inside of a house and remains there, the exact location of the child may not be possible to determine. In this case, the Fob can attempt to direct the adult to the last known recorded ("geocached") location of the child. The Bracelet can in the meantime still continue to search for a GNSS signal. If the Fob comes to the location of the last geocached location of the Bracelet and the Bracelet is still unable to produce a GNSS fix, the failsafe location mode can be activated.

In this mode, the Fob can direct the adult user to a series of points in order to conduct a series of measurements of Bracelet radio strength (RSSI) that can be correlated with the Fob location to eventually produce a meaningful approximation of the target location. In this mode, the Bracelet is assumed to be stationary. The adult can be directed as follows:

"Adult User Actions in Failsafe Location Mode"
1. When the adult arrives at the last known location (L1), the Fob can instruct the user to stop, use RSSI to produce an approximate range of distance, and determine an approximate distance, d1.
2. The Fob can then randomly determine a location (L2) that is d1 away from the current location and direct the adult user to it.
3. When the adult user reaches L2, the Fob can record RSSI, add RSSI to the L2 listing in a table of measurements, and use this measurement to produce an approximate distance to the Bracelet, d2.
4. Next, the Fob can calculate a new location, L3, which is no closer than d1 to L2 or L1.
5. By way of choosing a random location that satisfies this condition, producing a vector, and displaying a corresponding on-screen arrow, the Fob can instruct the user to move towards new location, L3.
6. When the user arrives at L3, the Fob can record RSSI, add RSSI to the L3 listing in a table of measurements, and use this measurement to produce an approximate distance to the Bracelet, d3.
7. The Fob can direct the adult user to repeat steps 4 and 5 until two or more data pairs (d4,L5), and d5,L5), etc., are created.
8. Using any suitable non-linear fitting trilateration technique, the Fob can determine the likely location of the wearable to a certain degree of confidence.
9. It a location can be determined, the Fob can display an arrow to this location. If a location cannot yet be determined to a high degree of confidence, the Fob can repeat step 8.

Any suitable non-linear fitting trilateration technique can be used in some embodiments. For example, a weighted nonlinear least squares fitting technique, with weights inversely proportional to the squared radii, can be used. For, example, the following code can be used in Mathematica to compute the fit:

fit=NonlinearModelFit[data, Norm[$\{x, y\}-\{x0, y0\}$], $\{x0, y0\}$, $\{x, y\}$, Weights$\rightarrow$1/observations$^2$]

For large radii, more accurate (spherical or ellipsoidal) solutions can be found merely by replacing the Euclidean distance Norm[$\{x, y\}-\{x0, y0\}$] by a function to compute the spherical or ellipsoidal distance. In Mathematica this could be done, e.g., via fit=NonlinearModelFit[data, GeoDistance[$\{x, y\}, \{x0, y0\}$], $\{x0, y0\}$, $\{x, y\}$, Weights$\rightarrow$1/observations$^2$]

One advantage of using a statistical technique like this is that it can produce confidence intervals for the parameters (which are the coordinates of the device) and even a simultaneous confidence ellipse for the device location. For example:

ellipsoid=fit["ParameterConfidenceRegion", ConfidenceLevel$\rightarrow$0.95];

fit["ParameterConfidenceIntervalTable", ConfidenceLevel$\rightarrow$0.95]

Figure 6:
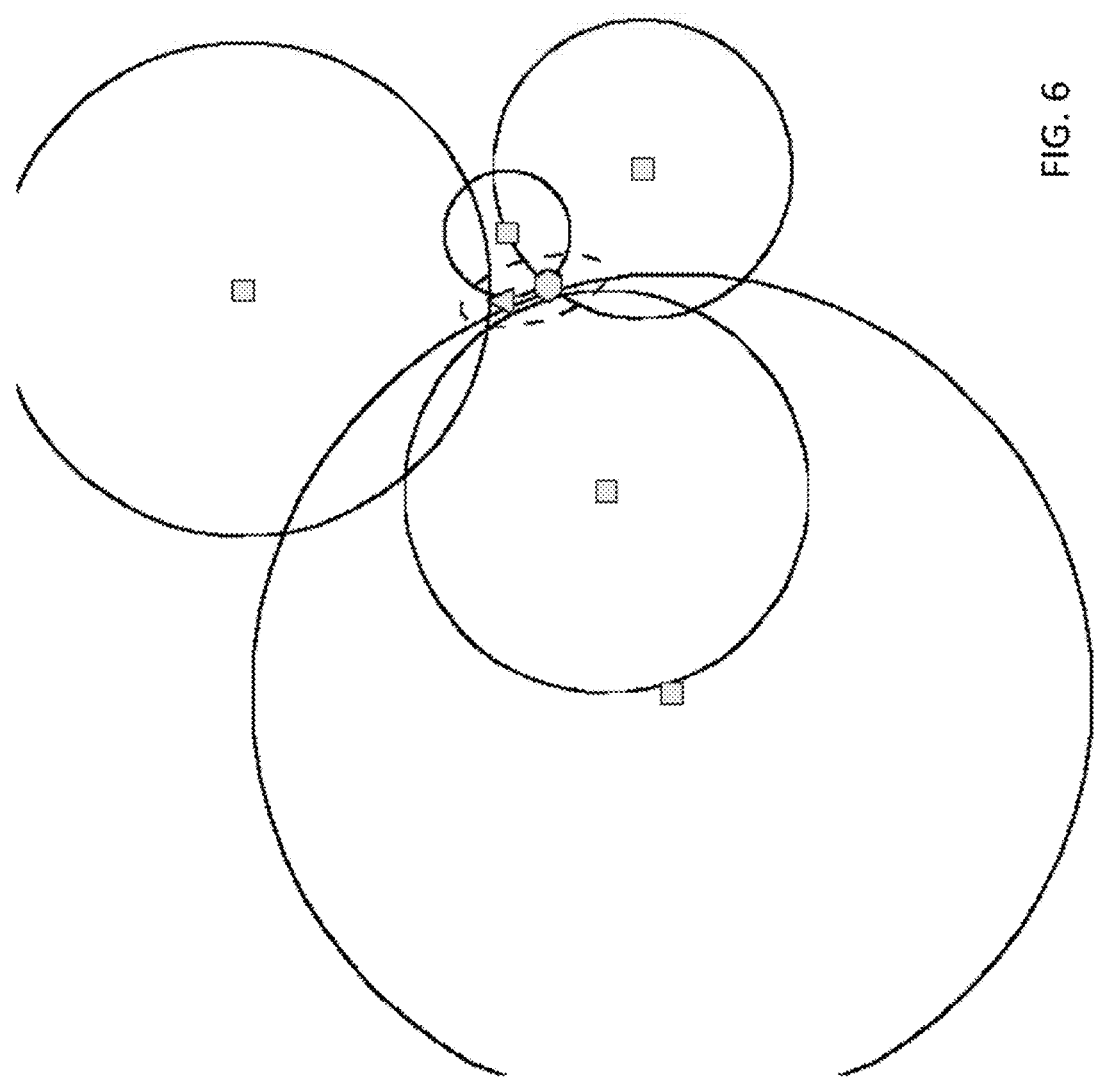
FIG. 6 is an illustration an example of a target device location technique in accordance with some embodiments.

FIG. 6 provides an illustration of such a technique. As shown,

- The squares are the (known) locations of a locator device, such as L1, L2, L3, etc., at the moment that a corresponding distance to target device was determined, e.g., d1, d2, d3, etc., respectively.
- The triangle is the true device location.
- The circles represent an area that is likely to contain a target device, based on radii stored in the aforementioned table of measurements as d1, d2, d3, etc. Ideally, they would all intersect at the true device location—but obviously they do not, due to measurement error inherent to inferring distance from RSSI.
- The hexagon is the estimated device location.
- The dashed-line ellipse demarcates a 95% confidence region for the device location.

The shape of the ellipse in this case is of interest: the locational uncertainty is greatest along a NW-SE line. Here, the distances to three access points (to the NE and SW) barely change and there is a trade-off in errors between the distances to the two other access points (to the north and southeast).

A more accurate confidence region can be obtained in some systems as a contour of a likelihood function; this ellipse is just a second-order approximation to such a contour.

When the radii are measured without error, all the circles will have at least one point of mutual intersection and—if that point is unique—it will be the unique solution.

The accuracy of this method increases by increasing the number of locations (L N) at which a distance to target (d N) can be estimated Three or more are needed to obtain confidence intervals. When only two are available, it finds one of the points of intersection (if they exist); otherwise, it selects an appropriate location between the two access points and directs the user to walk to this new location.

In some embodiments, the locator device can be designed to be used in primarily two orientations: hanging by an integral clip mechanism from a belt loop or backpack (perpendicular to the ground); and held in the palm of an adult user, parallel to the ground.

RF communication devices that cannot rely on continued singular orientation between nodes can present a design challenge that is most commonly solved by utilizing antennas that are omnidirectional in their radiation pattern. However, this solution is far from ideal when dealing with a communication link between two pedestrians, since a great amount of energy is wasted into the ground and sky.

Highly directional antennas, such as a parabolic or yagi antenna, are also not appropriate as they require a high degree of user compliance as well as certainty about the location of the other transceiver and antenna.

Accordingly, in some embodiments, by using an onboard accelerometer to infer orientation, an electronic antenna switch can be utilized to direct RF transmission and reception to one of two (or more) antennas, depending on which is most appropriate. Any suitable antenna type can be used to achieve any suitable beam pattern. For example, in some embodiments, a printed circular "panic button" antenna can be used to direct energy around the periphery of the device in a donut shaped pattern. As another example, in some embodiments, a patch antenna or a printed inverted-L antenna can be used.

It should be understood that the above steps of the flow diagram of FIG. 5 can be executed or performed in any order or sequence not limited to the order and sequence shown and described in the figure. Also, some of the above steps of the flow diagram of FIG. 5 can be executed or performed substantially simultaneously where appropriate or in parallel to reduce latency and processing times. Furthermore, it should be noted that FIG. 5 is provided as an example only. At least some of the steps shown in this figure may be performed in a different order than represented, performed concurrently, or altogether omitted.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claim(s) that follow. Features of the disclosed implementations can be combined and rearranged in various ways.

What is claimed is:

1. A locator device for locating a target device, comprising:
    a first transceiver configured to communicate with a second transceiver in the target device;
    a Global Navigation Satellite System (GNSS) receiver configured to receive data from a plurality of satellites for calculating a location;
    a visual indicator; and
    a hardware processor that:
        receives signals from the first transceiver;
        calculates a first estimated distance between the locator device and the target device based on the signals;
        controls whether the GNSS receiver is powered on or off based on the first estimated distance;
        causes the visual indicator to indicate an estimated direction to the target device from the locator device; and
        powers on the GNSS receiver of the locator device after it has been powered off for a first period of time, wherein the first period of time is determined based on a maximum travel rate of the target device and a second estimated distance between the target device and a first boundary.

2. The locator device of claim 1, wherein the hardware processor also controls whether a GNSS receiver of the target device is powered on or off based on the first estimated distance.

3. The locator device of claim 1, wherein the hardware processor also controls whether the first transceiver is powered on or off based on the first estimated distance.

4. The locator device of claim 3, wherein the hardware processor also powers on the first transceiver of the locator device after it has been powered off for a second period of time.

5. The locator device of claim 4, wherein the second period of time is determined based on the maximum travel rate of the target device and a third estimated distance between the target device and a second boundary.

6. The locator device of claim 1, further comprising a plurality of antennas coupled to the first receiver by at least one switch, wherein the hardware processor also controls which of the plurality of antennas is used based on an orientation of the locator device.

7. The locator device of claim 1, wherein the hardware processor also:
   determines that a location of the locator device is a current location;
   instructs a user of the locator device to move the locator device to a first new location that is the first estimated distance from the current location;
   calculates a first new distance estimate between the locator device and the target device at the first new location;
   instructs the user of the locator device to move the locator device to a second new location that is at least the first estimated distance from the first new location;
   calculates a second new distance estimate between the locator device and the target device at the second new location;
   instructs the user of the locator device to move the locator device to a third new location that is at least the first estimated distance from the second new location;
   calculates a third new distance estimate between the locator device and the target device at the third new location;
   instructs the user of the locator device to move the locator device to a fourth new location that is at least the first estimated distance from the third new location;
   calculates a fourth new distance estimate between the locator device and the target device at the fourth new location; and
   estimates a location of the target device based on the current location, the first new location, the second new location, the third new location, the fourth new location, the first estimated distance, the first new distance estimate, the second new distance estimate, the third distance estimate, and the fourth distance estimate.

8. The locator device of claim 7, wherein the hardware processor estimates the location of the target device using a non-linear fitting trilateration technique.

9. A method for locating a target device, comprising:
   receiving signals from a first transceiver, of a locator device, configured to communicate with a second transceiver in the target device;
   calculating a first estimated distance between the locator device and the target device based on signals received from the first transceiver;
   controlling whether a Global Navigation Satellite System (GNSS) receiver, of the locator device, which GNSS receiver is configured to receive data from a plurality of satellites for calculating a location, is powered on or off based on the first estimated distance;
   causing a visual indicator to indicate an estimated direction to the target device from the locator device; and
   powering on the GNSS receiver of the locator device after it has been powered off for a first period of time, wherein the first period of time is determined based on a maximum travel rate of the target device and a second estimated distance between the target device and a first boundary.

10. The method of claim 9, further comprising controlling whether a GNSS receiver of the target device is powered on or off based on the first estimated distance.

11. The method of claim 9, further comprising controlling whether the first transceiver is powered on or off based on the first estimated distance.

12. The method of claim 11, further comprising powering on the first transceiver of the locator device after it has been powered off for a second period of time.

13. The method of claim 12, wherein the second period of time is determined based on the maximum travel rate of the target device and a third estimated distance between the target device and a second boundary.

14. The method of claim 9, further comprising controlling which of a plurality of antennas that are coupled to the first receiver by at least one switch is used based on an orientation of the locator device.

15. The method of claim 9, further comprising:
   determining that a location of the locator device is a current location;
   instructing a user of the locator device to move the locator device to a first new location that is the first estimated distance from the current location;
   calculating a first new distance estimate between the locator device and the target device at the first new location;
   instructing the user of the locator device to move the locator device to a second new location that is at least the first estimated distance from the first new location;
   calculating a second new distance estimate between the locator device and the target device at the second new location;
   instructing the user of the locator device to move the locator device to a third new location that is at least the first estimated distance from the second new location;
   calculating a third new distance estimate between the locator device and the target device at the third new location;
   instructing the user of the locator device to move the locator device to a fourth new location that is at least the first estimated distance from the third new location;
   calculating a fourth new distance estimate between the locator device and the target device at the fourth new location; and
   estimating a location of the target device based on the current location, the first new location, the second new location, the third new location, the fourth new location, the first estimated distance, the first new distance estimate, the second new distance estimate, the third distance estimate, and the fourth distance estimate.

16. The method of claim 15, wherein the location of the target device is estimated using a non-linear fitting trilateration technique.

17. A locator device for locating a target device, comprising:
   a first transceiver configured to communicate with a second transceiver in the target device;

a Global Navigation Satellite System (GNSS) receiver configured to receive data from a plurality of satellites for calculating a location;
a visual indicator; and
a hardware processor that:
  receives signals from the first transceiver;
  calculates a first estimated distance between the locator device and the target device based on the signals;
  controls whether the GNSS receiver is powered on or off based on the first estimated distance;
  causes the visual indicator to indicate an estimated direction to the target device from the locator device;
  controls whether the first transceiver is powered on or off based on the first estimated distance; and
  powers on the first transceiver of the locator device after it has been powered off for a period of time, wherein the period of time is determined based on a maximum travel rate of the target device and a second estimated distance between the target device and a boundary.

18. The locator device of claim 17, wherein the hardware processor also controls whether a GNSS receiver of the target device is powered on or off based on the first estimated distance.

19. The locator device of claim 17, further comprising a plurality of antennas coupled to the first receiver by at least one switch, wherein the hardware processor also controls which of the plurality of antennas is used based on an orientation of the locator device.

20. The locator device of claim 17, wherein the hardware processor also:
  determines that a location of the locator device is a current location;
  instructs a user of the locator device to move the locator device to a first new location that is the first estimated distance from the current location;
  calculates a first new distance estimate between the locator device and the target device at the first new location;
  instructs the user of the locator device to move the locator device to a second new location that is at least the first estimated distance from the first new location;
  calculates a second new distance estimate between the locator device and the target device at the second new location;
  instructs the user of the locator device to move the locator device to a third new location that is at least the first estimated distance from the second new location;
  calculates a third new distance estimate between the locator device and the target device at the third new location;
  instructs the user of the locator device to move the locator device to a fourth new location that is at least the first estimated distance from the third new location;
  calculates a fourth new distance estimate between the locator device and the target device at the fourth new location; and
  estimates a location of the target device based on the current location, the first new location, the second new location, the third new location, the fourth new location, the first estimated distance, the first new distance estimate, the second new distance estimate, the third distance estimate, and the fourth distance estimate.

21. The locator device of claim 20, wherein the hardware processor estimates the location of the target device using a non-linear fitting trilateration technique.

22. A method for locating a target device, comprising:
  receiving signals from a first transceiver, of a locator device, configured to communicate with a second transceiver in the target device;
  calculating a first estimated distance between the locator device and the target device based on signals received from the first transceiver;
  controlling whether a Global Navigation Satellite System (GNSS) receiver, of the locator device, which GNSS receiver is configured to receive data from a plurality of satellites for calculating a location, is powered on or off based on the first estimated distance;
  causing a visual indicator to indicate an estimated direction to the target device from the locator device;
  controlling whether the first transceiver is powered on or off based on the estimated distance; and
  powering on the first transceiver of the locator device after it has been powered off for a period of time, wherein the period of time is determined based on a maximum travel rate of the target device and a second estimated distance between the target device and a boundary.

23. The method of claim 22, further comprising controlling whether a GNSS receiver of the target device is powered on or off based on the first estimated distance.

24. The method of claim 22, further comprising controlling which of a plurality of antennas that are coupled to the first receiver by at least one switch is used based on an orientation of the locator device.

25. The method of claim 22, further comprising:
  determining that a location of the locator device is a current location;
  instructing a user of the locator device to move the locator device to a first new location that is the first estimated distance from the current location;
  calculating a first new distance estimate between the locator device and the target device at the first new location;
  instructing the user of the locator device to move the locator device to a second new location that is at least the first estimated distance from the first new location;
  calculating a second new distance estimate between the locator device and the target device at the second new location;
  instructing the user of the locator device to move the locator device to a third new location that is at least the first estimated distance from the second new location;
  calculating a third new distance estimate between the locator device and the target device at the third new location;
  instructing the user of the locator device to move the locator device to a fourth new location that is at least the first estimated distance from the third new location;
  calculating a fourth new distance estimate between the locator device and the target device at the fourth new location; and
  estimating a location of the target device based on the current location, the first new location, the second new location, the third new location, the fourth new location, the first estimated distance, the first new distance estimate, the second new distance estimate, the third distance estimate, and the fourth distance estimate.

26. The method of claim 25, wherein the location of the target device is estimated using a non-linear fitting trilateration technique.

* * * * *